June 6, 1961 C. A. PARKER 2,987,243

READ-IN DECODING TRANSLATOR FOR LISTER CALCULATORS

Filed Nov. 15, 1957 7 Sheets-Sheet 1

*INVENTOR.*
CHARLES A. PARKER

*BY* Elmer W. Edwards

AGENT

June 6, 1961 C. A. PARKER 2,987,243

READ-IN DECODING TRANSLATOR FOR LISTER CALCULATORS

Filed Nov. 15, 1957 7 Sheets-Sheet 2

INVENTOR.
CHARLES A. PARKER
BY Elmer W. Edwards
AGENT

READ-IN DECODING TRANSLATOR FOR LISTER CALCULATORS

Filed Nov. 15, 1957 7 Sheets-Sheet 3

INVENTOR.
CHARLES A. PARKER
BY Elmer W. Edwards
AGENT

READ-IN DECODING TRANSLATOR FOR LISTER CALCULATORS

INVENTOR.
CHARLES A. PARKER

BY Elmer McEdwards

AGENT

June 6, 1961 C. A. PARKER 2,987,243

READ-IN DECODING TRANSLATOR FOR LISTER CALCULATORS

Filed Nov. 15, 1957 7 Sheets-Sheet 5

*INVENTOR.*
CHARLES A. PARKER
BY Elmer W. Edwards
AGENT

June 6, 1961 C. A. PARKER 2,987,243
READ-IN DECODING TRANSLATOR FOR LISTER CALCULATORS
Filed Nov. 15, 1957 7 Sheets-Sheet 6

INVENTOR.
CHARLES A. PARKER
BY Elmer W. Edwards
AGENT

| DIGIT VALUE OF STORED DATA | CODED VALUE OF STORED DATA | DECODING PLATES OPERATED | MASTER SOLENOID SETS ALL STOP PAWLS TO ACTIVE POSITION FOR 0. PERMUTATION SLIDES RETRACT STOP PAWLS. | STOP PAWLS REMAINING ALIGNED WITH ACTUATORS. ACTIVE PAWL |
|---|---|---|---|---|
| 0 | 0 | NONE | NONE | 0, 1, 2, 3, 4, 5, 6, 7, 8 |
| 1 | 1 | 1 | 0, 2, 4, 6, 8 | 1, 3, 5, 7 |
| 2 | 2 | 2 | 0, 1, 4, 5 | 2, 3, 6, 7, 8 |
| 3 | 2+1 | 2+1 | 0, 1, 2, 4, 5, 6, 8 | 3, 7 |
| 4 | 4 | 4 | 0, 1, 2, 3 | 4, 5, 6, 7, 8 |
| 5 | 4+1 | 4+1 | 0, 1, 2, 3, 4, 6, 8 | 5, 7 |
| 6 | 4+2 | 4+2 | 0, 1, 2, 3, 4, 5 | 6, 7, 8 |
| 7 | 4+2+1 | 4+2+1 | 0, 1, 2, 3, 4, 5, 6 | 7 |
| 8 | 8 | 8 | 0, 1, 2, 3, 4, 5, 6, 7 | 8 |
| 9 | 8+1 | 8+1 | 0, 1, 2, 3, 4, 5, 6, 7, 8 | NONE |

INVENTOR.
CHARLES A. PARKER
BY Elmer W. Edwards
AGENT 2,987,243

READ-IN DECODING TRANSLATOR FOR LISTER CALCULATORS

Charles A. Parker, East Orange, N.J., assignor to Monroe Calculating Machine Company, Orange, N.J., a corporation of Delaware Filed Nov. 15, 1957, Ser. No. 696,866
17 Claims. (Cl. 235—60)

The present invention relates to read-in translatar devices wherein data, such as sensed in coded form from a record media, for example, as are obtained from the well-known perforated tape or punched record cards, is caused to be translated into a mechanical movement so as to set selective stop elements which control digit value entries within the register/printing devices of well-known lister-calculating machines. More particularly the present invention has relation to improvements in code read-in translator devices of the type such as disclosed in the co-pending U.S. application Serial No. 593,508 filed by the same inventor June 25, 1956.

In said co-pending application a series of permutation slides are provided each representing an uncoded number of ordinary significance and being movable lengthwise so as to set a corresponding value stop pawl member, which acts subsequently to control the digit value movement of the differentially displaceable actuator means controlling operations of the register-printing devices. The selection of any one of the permutation slides being effected through means of a plurality of decoding slide plates which collectively normally obstruct a movement of all of the permutation slides. Upon adjustment, either singly or in selected combinations, of the encoding plates in a movement perpendicular to that of the direction of movement of the permutation slides certain translator elements on the plates are brought into active position for determining the movement of a selective one of the permutation slides which corresponds to a digit value in accordance with the particular combination of said translator elements remaining active with said slides following such displacement of the decoding plates.

In the contemplated mode of operation of said earlier filed application the active decoding plates are first caused to be displaced by related electromagnets and thereafter a holding means common to all the permatation slides and being under control of a suitable electromagnetic means provided in the circuit will act to release the slides to the control of the decoding plates. In such a sequence of control operations, however, not only is added time required but at such times as the input control circuits include operations of more than one of the encoding plates it may occur that any variation in the read-in impulse circuits could cause a premature release of a permutation slide before all of the potentially active ones of the decoding plates have been displaced. Under such a condition a permutation slide might inadvertently engage with and prevent operation of an, as yet, unset one of the active decoding plates and a possible incorrect selection of a digit value stop pawl member might occur, which thus would effect a mis-entry of values within the machine.

One object of the present invention is the provision of improved code translating devices adapted to obviate such a condition.

As another object the invention provides for a more simplified read-in translator device which employs code translating elements on selectively operable combinations of decoding plates so as to directly operate a plurality of permutation slides in response to an input signal, whereby a selective digit value stop pawl is rendered active for the controlling of a digit value entry in the decimal system.

A further object of the invention is the provision of means for setting digit value stop pawls simultaneously with the operations of a decoding means in a read-in translator device and effect thereby a more rapid read-in operation.

Another object of the invention is the provision of means adapted for displacing the decoding plates in a movement substantially parallel to that of a movement of the permutation slides in setting the value stop pawls and which permits thereby impulse timing variations to occur within the read-in circuit.

As another object the invention provides a means for presetting all the digit value pawls into aligned position with the related order actuator means for the register/printing devices and to subsequently displace selective combinations of said stops out of said aligned position, whereby a selective one of the stops remaining in active position with respect to a related actuator will act to control digit value operations of the said actuator means.

With the above and other objects in view the nature of which will appear as the description proceeds, the invention resides in the novel construction, combination and arrangement of parts as hereinafter described with reference to the accompanying drawings and more particularly defined by the appended claims.

*In general*

Figure 1:
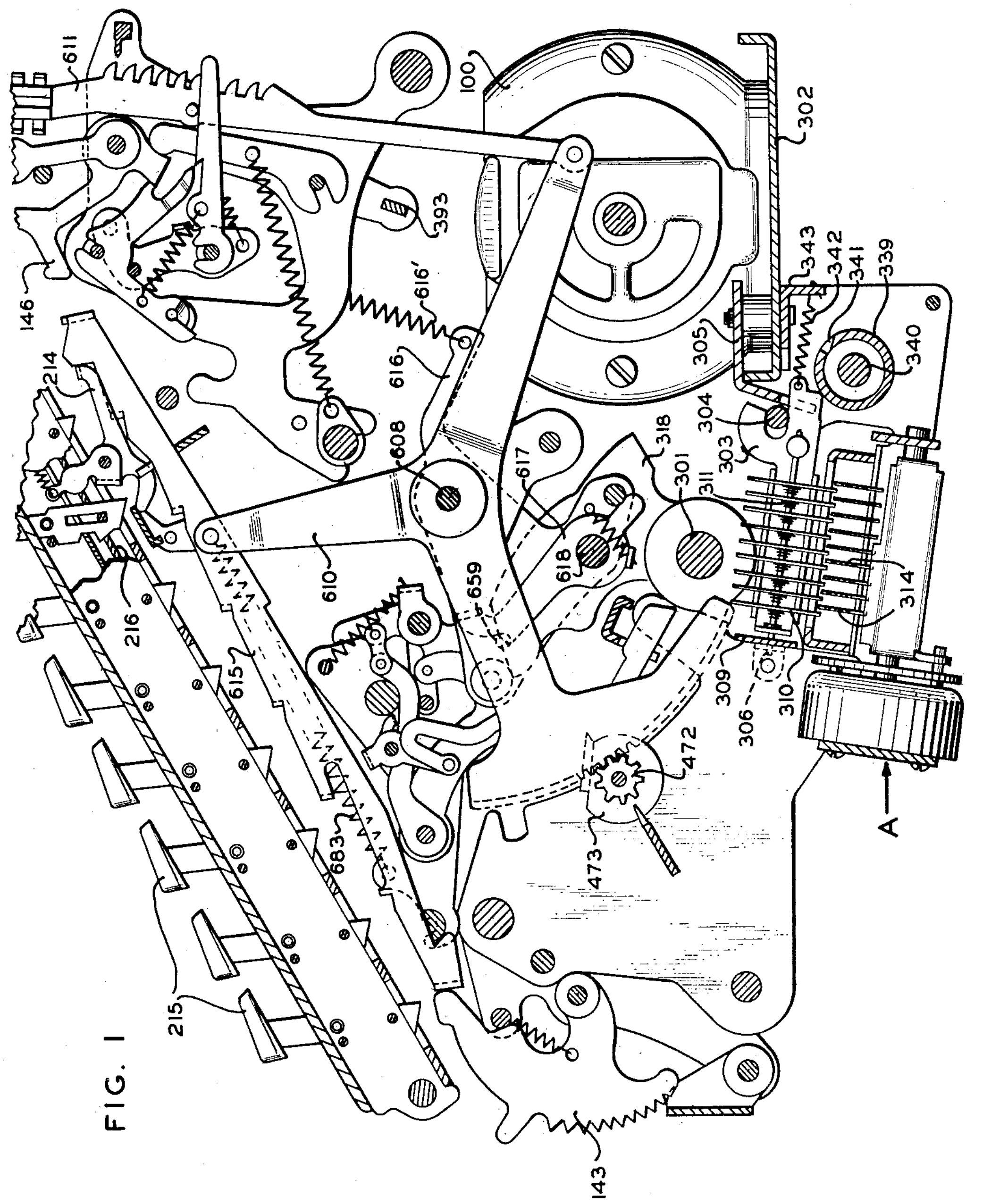
FIG. 1 is a right cross-sectional view taken substantially through the middle of a lister-calculating machine to which the present invention has been applied.

Referring to the drawings the lister-calculator to which the invention is shown as applied is of a well-known type employing registering and printing devices which are operable under control of reciprocatory actuator devices differentially settable to well-defined positions indicative of a zero and 1 to 9 digit values representative of the decimal system of notation. Such a machine is disclosed in its essential features in U.S. Patent 1,932,013 issued October 24, 1933 to Loring P. Crosman, as modified by the disclosure of Patent 1,946,572 issued February 13, 1934 and Patent 2,298,201 issued October 6, 1942 to the same inventor and to which reference is made for details of structure and operation not herein set forth.

It will be sufficient to say that in the normal operations of said machine amounts set up on the digit keys 215 (FIG. 1) for each denominational order are transferred, upon operation of suitable cyclic operating control keys, to a series of accumulator wheels 473 by means of a series of spring operated differential actuators 610 loosely mounted upon a transverse shaft 608. The forward arm of each differential actuator 610 is provided with segmental rack teeth adapted to mesh with the pinions 472 of the series of accumulator wheels 473. Index bars 615 are pivotally connected with the upper arms of levers 610, these index bars being moved, upon counterclockwise rotation of the levers, into engagement with the stems of selectively depressed keys 215. Type bars 611 are pivotally connected to the rearward arm of levers 610, the type bar being provided with a longitudinally disposed series of type representing the digits 0 and 1 to 9. The digit keys which have been depressed to represent a value are latched by suitable slide means 216 in position with the bottoms of their stems lying in the path of movement of the related stop lugs of the bars 615, allowing such bars to advance a distance proportional to the value of the keys upon operation of the machine. Depression of a digit key will also remove a column latch 214 from the path of movement of its selected stop bar 615, these latches preventing movement of a stop bar and levers 610 in any column in which no key is depressed. Each of the racks 610 are held in their normal clockwise position, against tension of their respective springs 683, by a stud 659 fast in said racks and having engagement with a series of dogs 617 pivotally mounted upon the transverse rod 618 supported within a rocker frame 616 loosely mounted on the shaft 608.

A rock shaft 301 is oscillated by means of an electric motor 100 connected through suitable gearing and clutch means 103—104 (FIG. 2) with a rock arm 316 fast with shaft 301, by means of a connecting rod 108, so that as a crank arm 105 is rotated by the motor the shaft 301 will be oscillated.

Rock shaft 301 is provided with cam means 318 (FIG. 1) for governing the movement of frame 616. As shaft 301 is rotated forwardly cam 318 will permit frame 616, under influence of spring 616′, to be rocked counterclockwise and any of the levers 610 which have been released by the depression of digit keys 215 will be allowed to rotate under influence of their springs 683 until they are stopped by the lugs of bar 615 contacting with the stems of the depressed keys. Upon rearward return movement of shaft 301 cam 318 will restore frame 616 and the dogs 617 will return the operated levers 610 to normal position. This excursion of the levers 610 serves to register amounts set in the keyboard upon one or more accumulators 473 and to set up a similar amount on the printing line of the type bars.

Release of clutch pawl 103 (FIG. 2) is effected upon depression of an operating key 114 having a rearward arm thereof engageable with the upper arm of a pivot latch 112 to effect release of said latch from a clutch control lever 106, whereupon said lever will be moved counterclockwise by its spring 89, and an insulation roller 109 on said lever will act to close a switch 110 in the circuit of the electric motor. In this movement the lower end of lever 106 will be disengaged from the tail of the spring urged clutch pawl 103, and allow said pawl to fall into engagement with the drive clutch member 104 to effect a machine cycle of operation.

As fully disclosed in reference Patent 1,932,013, during a cycle of operation the wheels of the accumulators 473 (FIG. 1) are rotated subtractively upon the forward stroke or additively upon the return stroke of the actuators 610, there being an actuator lever 610 and an associated accumulator wheel for each order provided in the machine. Near the end of a forward stroke of the actuators 610 suitable printing hammers 146 are caused to be released to effect a printing in accordance with the displacement of actuators 610 and type bars 611, upon a record sheet inserted around the usual platen.

Near the end of the cycle of motor operation an arm 115 (FIG. 2) of the crank member 105 upon which clutch pawl 103 is mounted will contact a tooth 116 of clutch lever 106 and force said lever back to latching position, breaking the electric circuit and bringing the lower end of lever 106 into the path of movement of a lug 103′ of the rotating clutch pawl 103 for effecting a normalizing of said pawl and terminating the operation.

*Code read-in translator*

Whlie the read-in translator devices are shown and described herein in relation to a particular code system which utilizes a read-in combination of significant digit values (8—4—2—1 and 0), and which values are translated to corresponding digit values 0 to 9 as expressed in the decimal system of notation it will be obvious to those skilled in the art to which the invention appertains that the devices are subject to modification to receive equally well various other code systems and to effect translations to various other systems of notation.

Various devices which are adapted to the purpose of sensing a coded record effected upon the usual tape means, punched record cards or the like and which may act to generate combinations of coded electrical impulses to selective input circuit leads 300 (FIG. 4) of the read-in translator devices herein disclosed are well known to those versed in the art and need not therefore be described herein.

Figure 4:
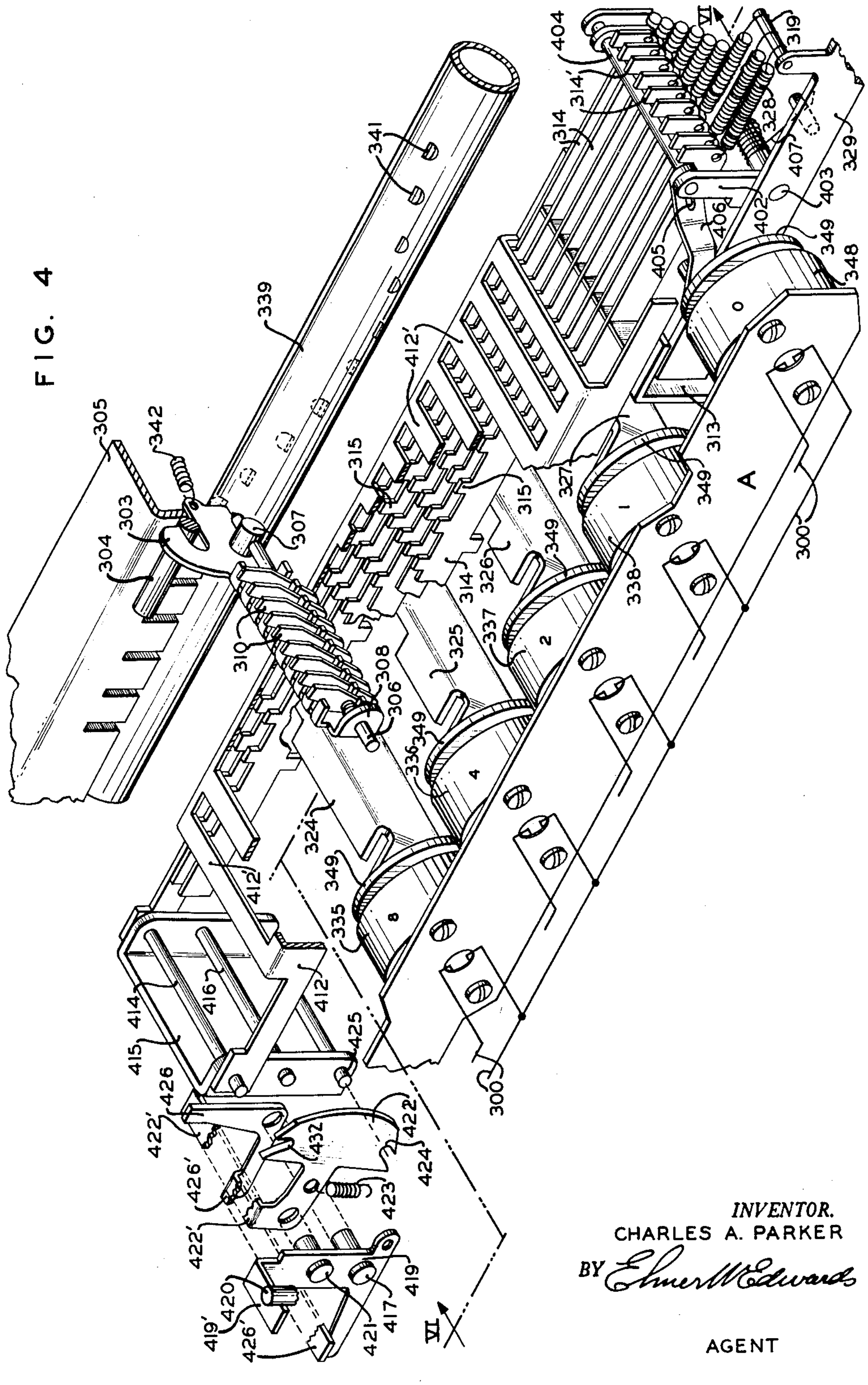
FIG. 4 is a perspective view of the novel read-in translator devices.
Figure 5:
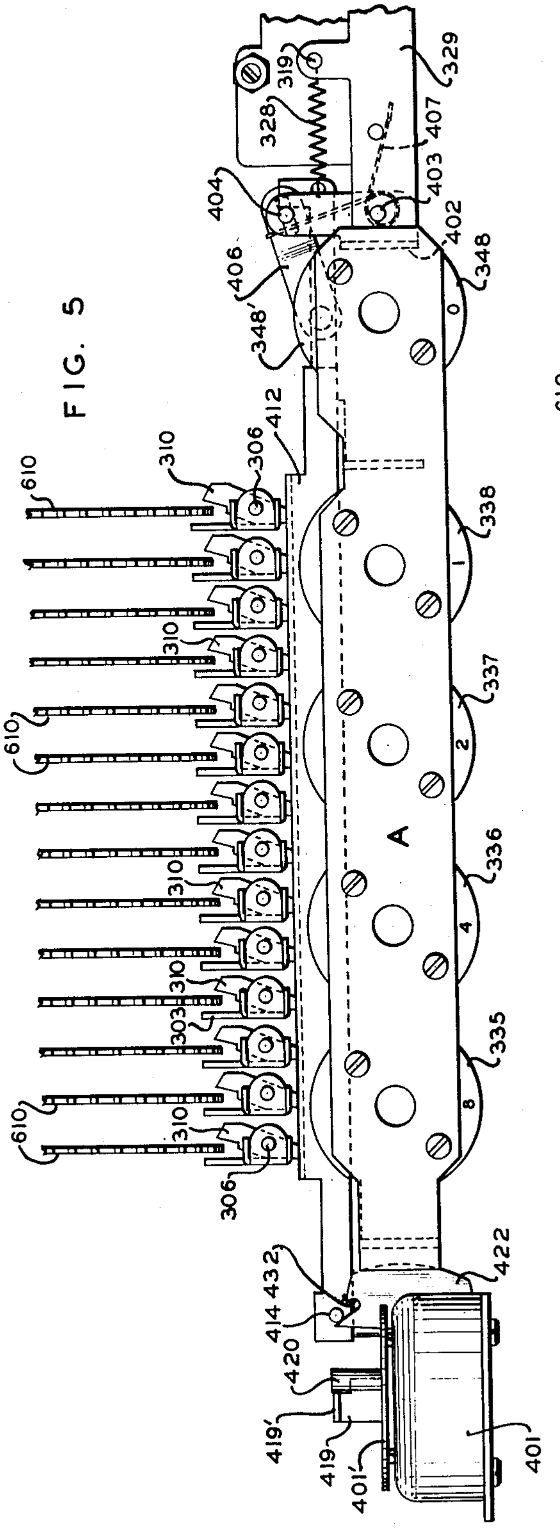
FIG. 5 is a front elevation of the novel read-in translator devices, the parts being at normal condition of rest.

With reference in particular to FIGS. 1, 4 and 5 of the drawings the read-in translator unit, designated by the letter A, is suspended to the bottom framing 302 (FIG. 1) of the lister-calculating machine and extends transversely beneath the actuator members 610. For each denominational order of the actuators 610 there is provided in the read-in translator means a slidable magazine member 303, each of which extends longitudinally of the related actuator 610. The rearward end of each of said magazines is supported through means of an open end slot therein upon a transverse rod 304, mounted within the left and right side framing of the translator unit. A suitable notched plate 305 serves to hold the magazines 303 in columnar spaced relation.

Mounted within each of the magazines 303 is a shaft 306 having the rearward end thereof fast within a stud 307 secured to the related magazine. The forward end of each shaft 306 projects through a lateral lug 308 (FIG. 4) of the respective magazines and extends also through a forward guide plate 309 (FIG. 1), to serve as a slidable support for the forward end of said magazines. Each magazine 303 is constructed to form a channel, with the upper and lower portion notched to receive a plurality of settable stop pawls 310 mounted upon the related shaft 306, there being a stop pawl 310 related to each of the digit value positions 0 through 8 of the related actuator racks 610. In the normal position of rest, illustrated in FIGS. 5 and 6, pawls 310 are each held in clockwise position and out of cooperation with the corresponding racks 610 through means of related friction springs 311 (FIG. 1). Springs 311 are mounted upon support shaft 306 for pawls 310 and are formed as a conical helix, with the final turn of said springs having a smaller diameter than that of shaft 306 so as to effect frictional engagement therewith, for the purpose of anchoring one end of said springs.

Supported for slidable movement within suitably notched left and right end support plates 312—313 (FIGS. 4, 6) is a series of nine permutation slides 314, said slides being adapted for cooperation with related stop pawls 310 indicative of the digit values 0 to 8 inclusive.

Slides 314 are each provided with a plurality of upwardly extending teeth 315, related each to a denominational order of the pawls 310 and being zoned normally out of plane with said pawls.

The devices above set forth are similar to the structure as disclosed in the aforesaid co-pending application 593,508 and in which the permutation slides 314 have each four downwardly extending projections 320–323 for cooperation with related decoding elements 324–327. In the devices of the said earlier filed application, however, the decoding elements are formed upon slide plates which are slidable in a direction perpendicular to the direction of movement of the permutation slides and are adapted to control a selective one of the permutation slides for subsequent movement so as to set the corresponding digit value stop pawls to an active position for the controlling of a digit value entry within the machine.

In the said earlier arrangement the coded incoming signals may release more than one of the decoding plates and a slight variation in signal timing might cause the operation of one of the said plates slightly before another, which might thereby release a permutation slide for operation before the second decoding plate has had time to operate. Under such a condition the operated slide could block movement of the tardy decoding plate and cause a misoperation to occur.

To obviate such a contingency projections 320–323 of the permutation slides 314 in the present invention are adapted to cooperate (as in the manner hereinafter more fully to be described) with related decoding elements as formed upon the leftward edge of a plurality of rocker plates 324–327, whereby the said elements are movable in a direction substantially parallel to that of a movement of the permutation slides 314.

Operation of the translator devices embodied in the present invention is based upon a system which calls for a simultaneous displacement of selective groups of the stop pawls 310 from an active to an inactive position relative to the path of movement of the related order of the actuator levers 610 and thereby determine a particular stop pawl which is to be active for controlling a digit value operation of the actuator lever 610. It will be noted that the decoding elements in the instant case serve to directly displace a plurality of the slides 314 for effecting such displacement of the selective groups of the stop pawls 310, and have thus eliminated any need for an intermediate means in effecting operation of the slides 314, such as that utilized in the earlier disclosed devices.

Figure 6:
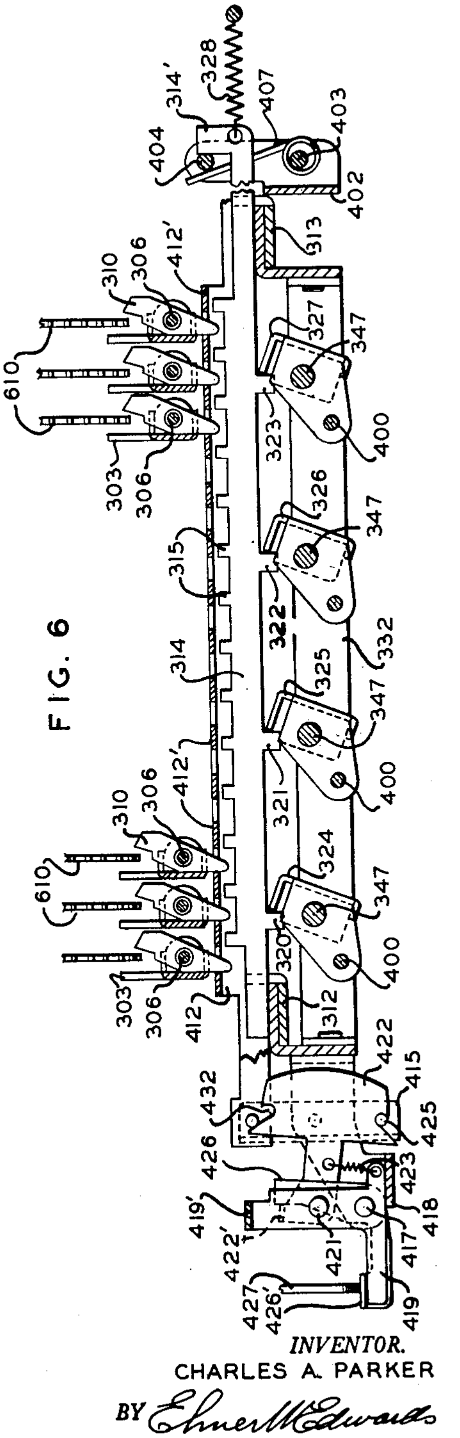
FIG. 6 is a transverse cross-sectional view taken substantially on line VI—VI of FIG. 4, the parts being at normal condition of rest.
Figures 9, 10:
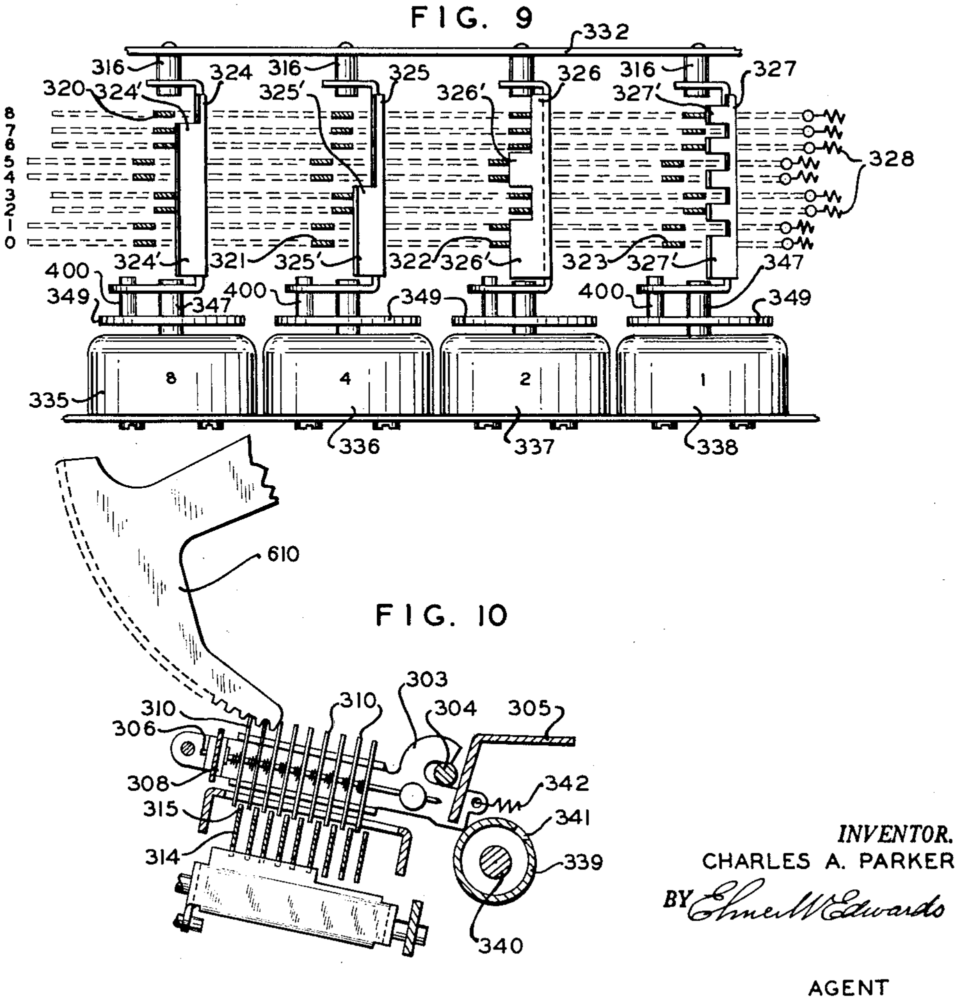
FIG. 9 is a plan view illustrating the decoding plates and permutation slides as set for a digit value 2 registration control.
FIG. 10 is a detail view showing a denominational order magazine returned to normal set position with the stop pawls thereon out of alignment with the permutation slides, and showing also a register actuator in engagement with the active digit value 2 stop pawl.

To permit operations of the lister-calculating machine independently of the translator devices all of the stop pawls 310 are normally in their position of rest out of control relation with the actuator levers 610, as illustrated in FIGS. 5 and 6. For operations under control of the translator however special means including a master solenoid 401 will act in response to a first incoming signal to preadjust all of the stop pawls 310 provided in the machine into the path of movement to be traversed by the related denominational orders of the said actuator levers 610. Following the above-described adjustment of the parts the denominational orders of said stop pawls 310 are moved successively each into and out of cooperation with the permutation slides 314 through successive operation of the magazines 303, by suitable indexing devices to be described. After each said indexing operation a selective group of the stop pawls 310 relative to each successive order of actuator levers 610 will be displaced out of alignment therewith in an operation of selective combinations of the permutation slides 314. Said operation of the slides 314 is effected by the forward edges of the active decoding rocker plates 324–327 (FIG. 9) as determined in accordance with the table illustrated in FIG. 15, in which it will be noted that with the stop pawls 310 being arranged in an ascending order digit value sequence, as shown in FIG. 10, only the lowermost of any digit value pawl as remain in the set position is active for cooperation with the related order actuator 610 so as to control an extent of movement thereof.

Figures 11, 12, 15:
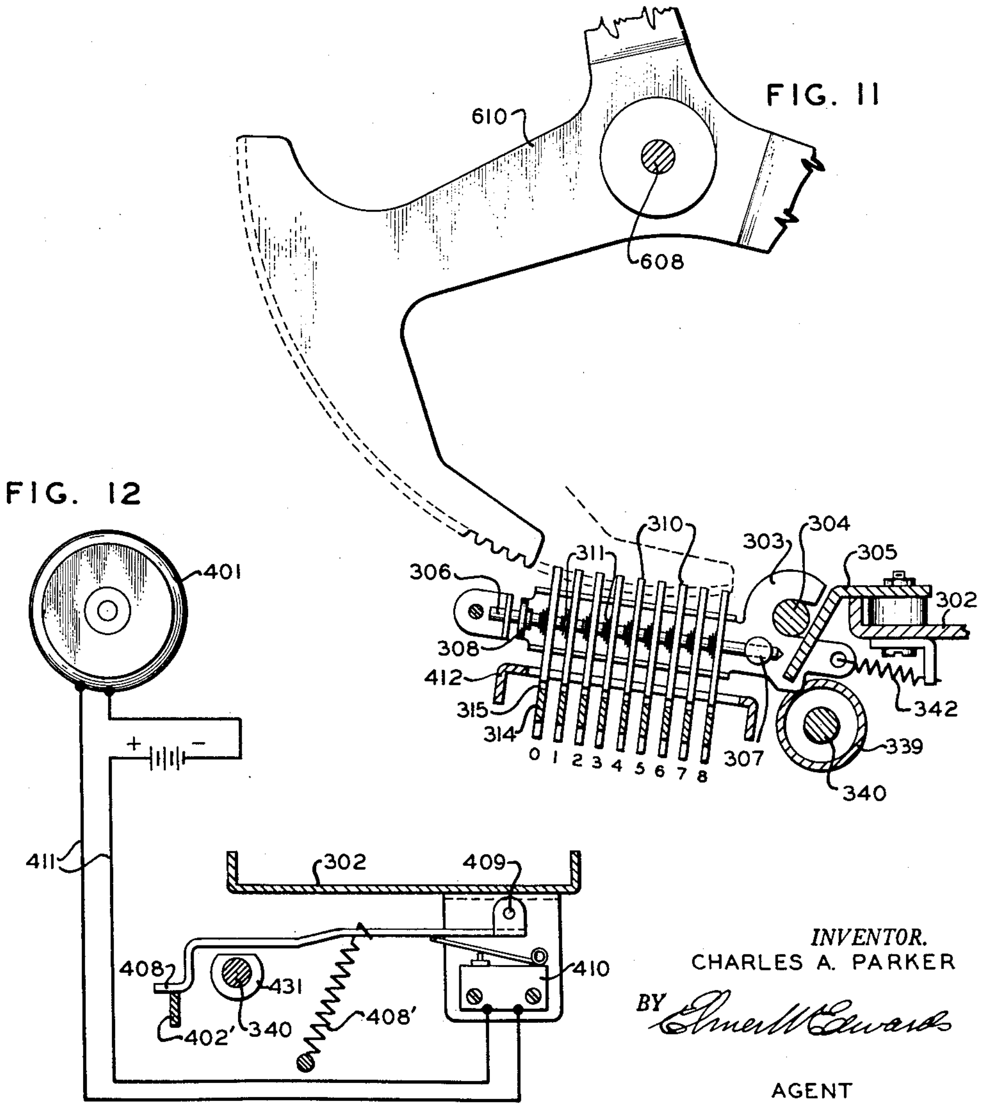
FIG. 11 is an enlarged detail view similar to FIG. 10 but showing a magazine in displaced position for aligning the stop pawls thereon with the permutation slides.
FIG. 12 is a detail of a circuit switch control means operable to disable the motor circuit during operations of the read-in translator devices and which controls also a master solenoid operating universal means for setting all the stop pawls.
FIG. 15 is a table illustrating the system of operation of the translator devices.

In accordance with the table shown in FIG. 15 decoding plates 324–327 are related each to a coded digit value 1, 2, 4 and 8 respectively and are adapted for operation in the manner and purpose as will now be described.

Decoding plates 324–327 are each supported at their rearward end for pivotal movement upon a related stud 316 fast within a rear cross plate 332, while the forward end of each of said plates is mounted upon a corresponding stud shaft 347 each shaft being in part with the armature 349 of a related rotary type solenoid 335–338 respectively, of well-known structure.

The four solenoids 335–338 have relation in the present code system to the significant digit values 1, 2, 4 and 8 respectively, as indicated by the numerals thereon, and the related armatures 349 of each has drive pin connection 400 with the related of the decoding plates 324–327 of corresponding value. Also, there is provided a fifth rotary solenoid, numbered 348 (FIG. 4) on the drawings, said solenoid being operable independently of the decoding plates 324–327 and adapted to the control of a zero operation in the code system, as hereinafter described.

Armatures 349 of the solenoids 335–338 and 348 are each biased in clockwise direction (FIG. 4) by a suitable spring within the solenoid, whereby decoding plates 324–327 are each held normally rocked in rightward position.

Figure 7:
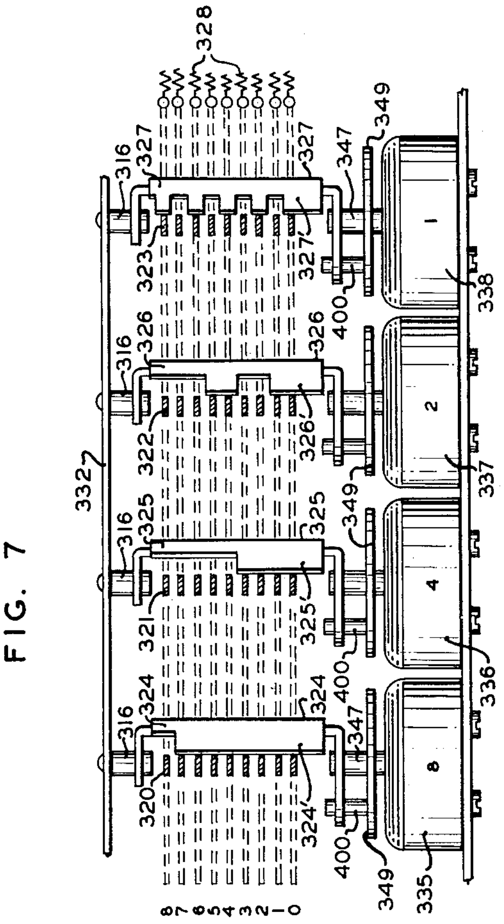
FIG. 7 is a plan view showing the decoding plates and permutation slides in a rightward normal condition of rest.
Figure 8:
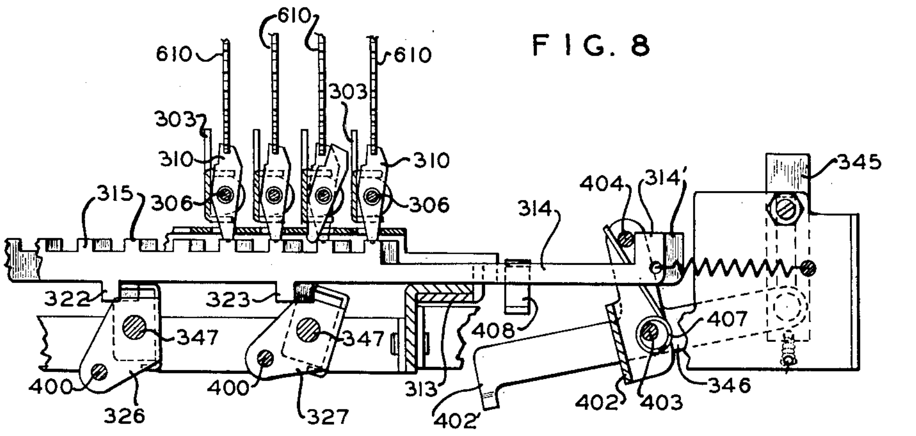
FIG. 8 is a detail front view of certain of the parts of FIG. 6 shown in a leftward operated position.

Upon a momentary selective energizing of any of the said solenoids, as through an electrical read-in impulse received by the input leads 300 in accordance with data sensed in the coded form 8—4—2—1 and 0 stored upon the usual perforated tape, punched card or the like, the armatures 349 of the related solenoids will be rotated counterclockwise (FIG. 4) momentarily and returned. During said operation the corresponding plates 324–327 are reciprocated therewith to effect a leftward (FIGS. 4–9) and return movement of the decoding elements formed by the projections 324′–327′ (FIG. 7) arranged thereon. Upon leftward movement the decoding elements 324′–327′ of the active plates 324–327 are adapted to engage with related projections 320–323 (FIG. 6) for displacing a selective combination of the permutation slides 314 leftward, whereby the teeth 315 on said slides, being related to each denominational order of the stop pawls 310, will effect a displacement of a selective group of said stop pawls for each successive denominational order of columns, as in the following manner.

In the contemplated mode of operation digit values for multidenominational order amounts are to be received into the translator devices in a sequential manner and thereafter will be registered and printed in a simultaneous manner in an operation of the lister calculator, and it will be recalled that stop pawls 310 are normally zoned out of cooperative relation with the teeth 315 of the permutation slides 314, as seen in FIG. 10. Indexing means for successively operating each of the magazines 303, earlier described, are provided whereby each order of stop pawls 310 in successive manner from higher to lower denominational order will be moved into and out of cooperative relation with the corresponding orders of the actuator racks 610. Thereafter means under control of said indexing devices, as will hereinafter be described, will effect an automatic operation of the lister-calculator, whereby all of the racks 610 are brought forward until stopped by engagement in each order with the selected one of the digit value pawls 310 which has been determined as active by the displacement of a group of the pawls 310 to their inactive control position, as in accordance with the table of FIG. 15 previously described, thereby to register and print the complete translation multidenominational order amount.

*Means controlling stop pawl setting in successive orders*

Figure 13:
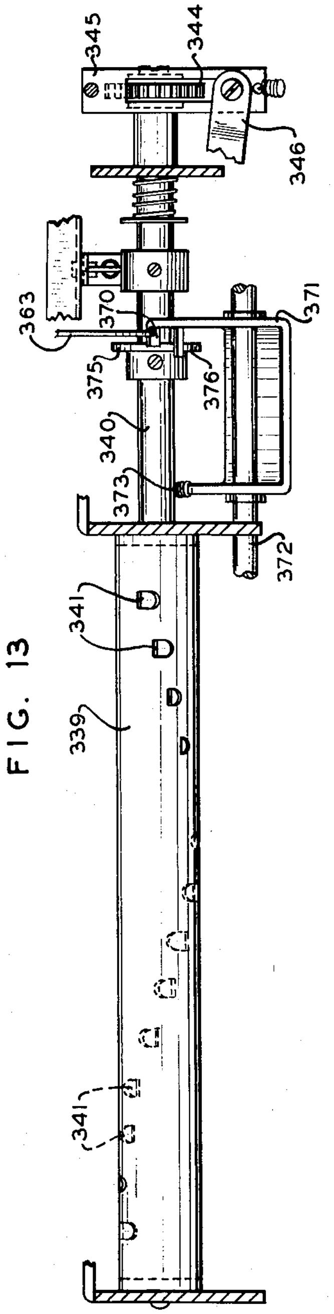
FIG. 13 is a detail front view of an indexing cam means for sequentially controlling consecutive denominational orders of operation of the translator devices.

As shown in FIGS. 4 and 13, extending transversely of the rearward end of the plurality of magazine members 303 is a tubular member 339 secured upon a shaft 340 (FIG. 13) which extends through said tube and is mounted for rotation within the left and right side framing of the translator unit. Within the peripheral circumference of tube 339 is milled a series of cam slots 341, arranged therein in a helical order manner so as to successively cooperate with each related order of the magazine members 303 (FIG. 4), as in the following manner.

Figure 14:
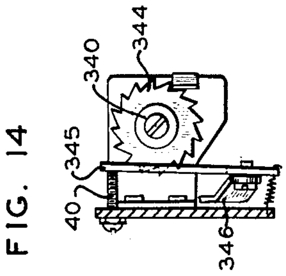
FIG. 14 is a right side detail elevation of said indexing means.

Cam tube 339 normally holds all of the magazine units 303 in a forward position, as shown in FIG. 1, against the tension of related springs 342, connected each to the rearward end of the related magazines 303 and to a rearward cross plate 343. Upon the right-hand end of the shaft 340 (FIGS. 13, 14) for cam tube 339 is secured a ratchet wheel 344 having engagement with an indexing pawl 345 pivotally secured to a rightwardly extending arm 346 of a bail 402 (FIGS. 4–6, 8) pivotally mounted upon a shaft 403 supported within the front and rear sub-plate members 329. Upon suitable upwardly extending arms of bail 402 is mounted a rod 404 extending transversely of the forward edge of projections 314′ formed upon the rearward end of the permutation slides 314. Rod 404 has connection, by means of a slotted opening 405, with a link 406 having connection at the opposite end thereof with the electromagnet 348. Bail 402 is biased in a clockwise direction by means of a suitable spring member 407 (FIG. 5), whereby arm 346 (FIG. 8) will normally hold indexing pawl 345 (see also FIGS. 13, 14) in a lowered position. Upon momentary oscillation of any one or more of the electromagnets 335–338 (FIG. 4) in response to a coded impulse signal, with consequent reciprocatory movement of any of the active slides 314, the projections 314′ of said slides will engage rod 404 and impart first a counterclockwise and thereafter return movement to the bail 402. In like manner an operation of electromagnet 348 (FIG. 4) is also adapted, through means of link 406, to effect a similar reciprocatory operation of bail 402. Thus in an energizing of any of the read-in magnets of circuit 300 bail 402 is oscillated to advance pawl 345 one tooth of ratchet wheel 344 (FIGS. 13, 14) and will upon subsequent release thereof index cam tube 339 one step of movement. To effect a first of said indexing operations, however, for the purpose of conditioning the higher order of said magazines 303 (FIG. 4) to active position, a preliminary code signal, which is stored upon the record media to precede the significant stored data thereon, is first read into the magnet 348 (but which may be entered into any of the magnets 335–338 if so desired).

In the above-described operation of bail 402 an arm 402′ thereon (FIGS. 8, 12) extending beneath a switch control arm 408 will permit said arm, under influence of a suitable spring 408′ (FIG. 12), to rock downwardly about its pivot support 409 to close a normally open switch 410 provided in a control circuit 411 for the master solenoid 401 (FIG. 5), to which reference is made earlier in the specification. Upon closure of switch 410 solenoid 401 is energized and will effect an operation of means adapted for simultaneously adjusting all of the stop pawls 310 from their normal position of rest shown in FIG. 5 to that wherein said pawls are all brought into the path of movement to be traversed by the related actuator levers 610, as in the manner now to be described. It may be noted at this time, however, that during the first indexing operation above-described a suitable cam collar 431 (FIG. 12) fast to the index shaft 340 will rock the lever 408 upwardly for releasing contact switch 410 so as to deenergize magnet 401 and thereafter collar 431 will maintain said switch in open condition until after a final indexing operation of shaft 340, at which time arm 402′ is again lifted into normal supporting engagement with lever 408.

Mounted within the translator unit A (FIGS. 4–6) so as to extend across all of the columns of stop pawls 310 is a frame 412 supported at the rightward end thereof, as viewed from the front of the machine, for slidable movement upon the guide plate 313. The opposite end of frame 412 is pivotally connected to a support rod 414 mounted within the upper end of a rocking plate 415 said plate being intermediately fulcrumed upon a longitudinally extending shaft 416 of the translator unit. Pivotally mounted at 417 upon a bracket 418 (FIG. 6), fast to the left frame plate 312, is a bell crank lever 419 having a forwardly extending lug 419′ adapted for engagement by a drive pin 420 (FIG. 5) in the armature 401′ of the solenoid 401. Pivotally mounted at 421 (FIG. 4) to bell crank 419 is a pitman lever 422 biased downwardly by spring means 423, whereby a notch 424 formed in the lower end of said pitman is normally in engagement with a rod 425 mounted within the lower end of the plate 415. Upon energizing of solenoid 401 (FIG. 5) earlier described, therefore, drive pin 420 moves leftwardly with armature 401′ to engage lug 419′ and impart counterclockwise movement (FIGS. 4, 6) to bell crank lever 419 about pivot 417, whereby said bell crank imparts leftward movement to the pitman 422. During said movement rod 425, being in engagement with notch 424, will effect thereby a clockwise operation to plate 415, so that frame 412 at this time is moved toward the right. Frame 412 forms a ladder structure having a plurality of cross-rungs 412′ adapted for engagement with the lower end of the pawls 310 and during said rightward movement of frame 412 all of the pawls 310 are simultaneously rocked thereby in a counterclockwise direction into the path of movement which is traversed by the corresponding order of the actuator levers 610. All of the pawls 310 having been thus simultaneously adjusted in response to the preliminary signal, as above described, are now in condition for any subsequent selective displacement thereof by the decoding plates 324–327, in the operation of said plates by successive operations of selective combinations of the magnets 335–338 as energized in response to the coded input signals for the successive denominational orders, in the manner earlier described. Upon a final operation of the cam shaft 340, by the indexing means 344—345 (FIGS. 13, 14), through the operation of magnets 335—338 or magnet 348 in response to the units order impulse to the read-in circuit 300 the cyclic clutch means 103—104, shown in FIG. 2, for the lister-calculator will be automatically tripped in the following manner.

Loosely mounted, near the right-hand end, upon shaft 304 is a bell crank lever 363 the upper arm of which has pivotal connection 364 with the lower end of a link 365. The upper end of link 365 has pin and slot connection 366 with a slide 367 guided at the lower end thereof by suitable slot engagement with a fixed stud 368 said slide having pivotal connection 369 with the latch member 112 for the clutch control lever 106 earlier described. The lower end of bell crank lever 363 is provided with a notched end normally in engagement with a lug 370 of a latch 371 fulcrumed upon a transverse rod 372. Latch 371 is biased in a clockwise direction to maintain lug 370 into engagement with bell crank 363 by suitable spring means 373 and such engagement of lug 370 with the notch of bell crank 363 serves to maintain said bell crank in a clockwise direction, against the tension of a spring member 374.

Figure 2:
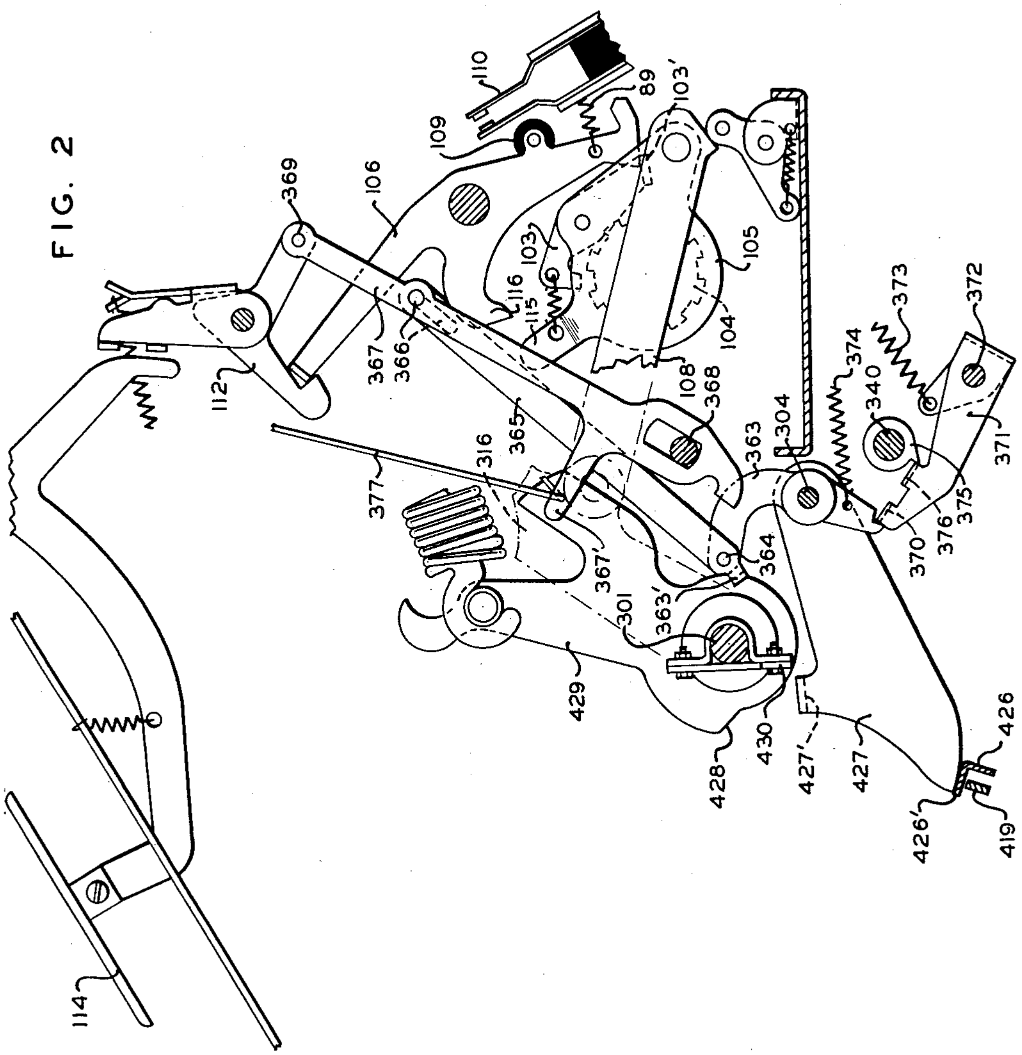
FIG. 2 is a right side elevation showing the motor clutch control devices for said machine.
Figure 3:
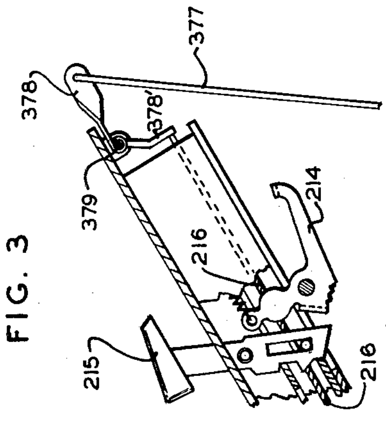
FIG. 3 is a detail view of a control means for releasing the column latches free of the register/printing actuator devices of said machine.

Secured upon shaft 340 (see also Fig. 13) of the cam tube 339 is a cam member 375 which is adapted during an indexing of said shaft, following an operation of the right-hand notch 341 of said tube in setting the lower order of the magazine members 303 earlier described, to effect engagement with a lug 376 of latch 371. Engagement of cam 375 with lug 376 will act to rock latch 371 downwardly releasing the lug 370 from bell crank 363 and permitting counterclockwise operation of said bell crank by its spring 374. Upon said operation link 365 will move slide 367 downwardly and release latch 112 from clutch lever 106 to start a machine cycle of operation. Slide 367 is provided with a forwardly extending arm 367' which has engagement with the lower end of a rod 377 connected at the upper end thereof with an arm 378 fast to a cross shaft 379 (FIG. 3). Fast also upon shaft 379 is a series of arms 378', there being an arm 378 related to each of the keyboard clear slides 216 which act to control the column latch members 214 for the actuators 610 (FIG. 1), earlier described. Upon downward operation of slide 367 (FIG. 2) rod 377 rocks arm 378, shaft 379 and arms 378' clockwise, as viewed in FIG. 3, so that arms 378' will move all the slides 216 forwardly and thereby release all the said latches 214 from the stop bars 615 and actuator levers 610, while also releasing any keys 215 that might have inadvertently been depressed.

During the above machine cycle of operation therefore all of the actuator levers 610 will be permitted to move forwardly until stopped by the active stop pawls 310 (FIG. 11) relative to each denominational order, whereby a registering and printing operation is effected in accordance therewith, as in the usual manner. In this connection it will be observed that no stop pawl 310 is provided for the digit value 9 since a 9 value translation from an 8+1 code read-in impulse is adapted to cause a related combination of decoding plates 324 and 327 (FIGS 6, 7) to displace all the stop pawls 310 of any such active orders out of cooperative relation with the related order actuator lever 610. Under such a condition the actuator lever 610 would then be permitted to move a full extent of its movement until stopped by engagement thereof with a fixed stop member 393 (FIG. 1) corresponding to a 9 step movement of the actuator. From the foregoing description, therefore, it will be obvious that in the devices of the present invention any of the stop pawls 310 which are to be active for controlling an extent of digit value operations of the actuator levers 610 will be determined by a displacement of all of pawls 310 which precede the active pawl and would otherwise intercept a movement of the actuator lever. Following a registering/printing operation, near the end of the forward stroke of the cyclic devices, all of the stop pawls 310 remaining in the active set position will be restored by the cyclic devices simultaneously to their normal position of rest out of cooperation with actuators 610, in the following manner. Loosely mounted upon the pivot shaft 417 (FIGS. 4, 6) for the bell crank lever 419, earlier described, is a bell crank lever 426 having an upwardly extending arm engaging a lug 422' formed on the pitman member 422. A lower arm of bell crank 426 is provided with a lug 426' which extends above the lower arm of bell crank 419 and beneath the forward end of a lever 427 loosely mounted upon the shaft 304, as shown in FIG. 2. Lever 427 is provided with a lug 427' extending laterally thereof and beneath the shoulder 428 of a lever 429 fast to the rock shaft 301 of the cyclic devices, earlier described. Near the end of the forward stroke of the cyclic devices shoulder 428 engages lug 427' and will rock lever 427 downwardly, whereby said lever engaging lug 426' will impart first a slight operation counterclockwise (FIG. 6) to bell crank 426, following which lug 426' engages bell crank lever 419 and imparts also counterclockwise movement thereto. During the first portion of operation of bell crank 426 the upper arm of said bell crank engages lug 422' and will impart counterclockwise movement to the pitman 422, thereby disengaging the lower notched end 424 of said pitman from the rod 425 of plate 415, earlier described, while bringing a similar notched end 432 in the upper portion thereof into engagement with the rod 414 of said plate. Upon continued operation of bell crank 426 lug 426' effects a counterclockwise operation to bell crank lever 419 so that pitman 422 is again carried leftwardly and will impart at this time a leftward movement to the ladder structure 412, previously described. During said leftward movement the cross rungs 412' of said structure will engage the lower end of any of the pawls 310 remaining in cooperative relation with the actuator levers 610 and will rock said pawls in a clockwise direction and out of the path of movement for the levers 610.

As is usual in machines of the character described herein, additive operations are effected in a return stroke of the actuators. Therefore, unless suitable means are otherwise provided the above-described removal of stop pawls 310 would release the actuators 610 to a further forward movement and thus destroy their setting. Well-known locking segments 143 (FIG. 1) related to each of the actuators 610 and including means controlled by the cyclic devices for locking said segments until after a return stroke of the actuators are provided, however, such as disclosed in the reference Patent 2,298,201.

It will be recalled that in the final indexing operation of the shaft 340 (FIG. 2) a cam means 375 moving past lug 376 has tripped latch 371 from the lever 363. During the forward movement of rock shaft 301, however, a clamp 430 on said shaft will act to engage with a lug 363' of the operated lever 363, restoring said lever clockwise into reengagement with the lug 370 of said latch 371. In said restoration of lever 363 the link 365 moves upwardly along slotted connection 366 and will free slide 367 for upward movement so as to permit a reengagement of the latch pawl 112 with the clutch lever 106, upon restoral of said lever 106 at the end of the machine cycle of operation as earlier described. Also, upward movement of slide 367, acting to release rod 377 and bell crank 378 (FIG. 3) will free the column latches 214 for restoration by their respective springs.

While there has been shown and described a preferred embodiment of the present invention, it will be obvious that changes in form and details of the device may be made by those skilled in the art, and it is, therefore, contemplated to cover by the appended claims any such modifications as fall within the true spirit and scope of the invention.

What I claim is:

1. Translator means for computers and the like comprising in combination, value indicating means, control stops therefor, permutation slides each movable over a fixed distance for effecting the displacement of a related one of said stops, decoding plates adapted each for moving a related group of the said permutation slides, magnetic means operable in response to coded input signals and adapted for operating selective combinations of said decoding plates for moving groups of said permutation slides in selected combinations for setting a selective plurality of said stops, and wherein selected ones of the unset stops are thereby rendered active to control a selective movement of the value indicating means.

2. Translator means for computers or the like comprising the combination of value indicating means, control stops therefor, permutation slides each movable over a fixed distance for effecting a uniform displacement of a related one of said stops, a plurality of decoding plates movable in a direction substantially coinciding to that of the said permutation slides and adapted each for moving a related group of said slides, magnetic means operable in response to coded input signals and adapted for selectively operating combinations of said decoding plates for moving selected combinations of groups of said permutation slides to set a related selected plurality of the said stops, and wherein selected ones of the unset stops are rendered active thereby for controlling a selective movement of the value indicating means.

3. In a computer or the like having value indicating means, differentially movable denominational order actuators therefor and a plurality of normally inactive value control elements related to the corresponding order of said actuators; the combination therewith of coded read-in translator devices including a universal means for preadjusting all the said value control elements to a potentially active position relative to the related order of said actuators, means responsive to selective input signals for thereafter restoring selective combinations of said value control elements to inactive position relative to the corresponding order actuator, and wherein selective ones of the value control elements remaining in the said preadjusted position are rendered active thereby to control a value entry movement of the related actuators.

4. In a computer or the like having denominational orders of digit value indicating means, related actuators therefor adapted each for displacement to and from differentially predetermined digit value positions; the combination therewith of coded read-in-translator devices including a plurality of digit value control stops for each of said actuators and being normally positioned out of cooperation therewith, a universal member cooperable with all the said stops, magnetic means responsive to an initial input signal for operating said universal member and to thereby simultaneously preset all the said stops to a potentially active position of cooperation with respect to the corresponding order of said actuators, decoding means adapted for operation in selective combinations as in accordance with a subsequent coded input signal, and wherein an operation of the decoding means acts to restore a plurality of selected ones of the said stops to their inactive condition relative to the related actuator, and wherein a selective one of the preset stops thereafter acts to effect selected control of a digit value movement of the related order of said actuators.

5. In a computer or the like having denominational orders of digit value indicating means, differentially movable actuators therefor and cyclic devices for effecting operation of said actuators; the combination of coded read-in translator devices including a plurality of digit value control stops normally out of alignment with the related order of said actuators, a universal member cooperable with all the said stops, electromagnetic means for operating said universal member to simultaneously move all the said stops in each order into alignment with the corresponding order actuators, decoding means responsive to selective input signals for restoring selected groups of said stops out of alignment with the related order actuator, and means operable thereafter by the cyclic devices for effecting an operation of said universal means to restore the remaining value stops out of alignment with the said actuators.

6. The invention according to claim 5 and including a reversing means between the said magnetic means and the said universal member, and wherein the said reversing means is normally in a condition for operation by the said magnetic means to effect a first reciprocatory movement of the universal member, and wherein the cyclic means thereafter effects adjustment of the said reversing means to a reverse control position, and wherein during continued operation of the cyclic means a reciprocatory movement is effected thereby to the universal member in a reverse path of movement to that imparted thereto by the said magnetic means.

7. In a computer or the like combination having value indicating means, differentially movable actuators therefor, digit value stops positioned normally out of alignment with the corresponding order of said actuators, permutation slides each normally ineffective of cooperation with the corresponding value digit stops for each denominational order, a universal member movable for preadjusting all the digit value stops into alignment with their respective actuators, a plurality of decoding plates each one adapted for displacing a related group of said permutation slides, indexing means operable by the movement of any said group of said permutation slides and adapted for displacing the digit value stops of successive denominational orders into and out of active relation with the permutation slides, electromagnetic means responsive to coded read-in signals for operating said decoding plates in selective combinations, and wherein said plates will move selected combinations of the permutation slides for restoring selected groups of the said value stops in the active order and thereby render selective ones of the preadjusted stops active for controlling a digit value operation of the related order actuator.

8. The invention according to claim 7 and electromagnetic means adapted for effecting a reciprocatory movement to the said universal member for preadjusting all the said value stop members into alignment with the corresponding orders of said actuators, circuit means therefor including a normally open switch, and electromagnetic means energized in response to a first read-in signal for operating said switch in effecting a first operation of said indexing means.

9. The invention according to claim 8 and having control means operable in a first operation of said indexing means for holding said switch in open circuit condition and thereby disable said universal means during subsequent operations of the said indexing means, and wherein said control means releases said switch in a final operation of said indexing means.

10. In a lister-calculator or the like having registering and printing devices and differentially movable actuators therefor; the combination of coded read-in translator devices including a plurality of digit value stop pawls positioned normally adjacent corresponding denominational orders of the said actuators, means including a universal frame for moving all the said digit value stop pawls into zoned alignment with the actuators of related orders, permutation slides related each to a corresponding digit value stop pawl of all orders and being normally out of alignment therewith, means for sequentially indexing successive orders of said stop pawls into and out of alignment with relation to the said permutation slides, a plurality of rock plates having operating edges collectively conforming to a given code system and adapted for displacing selected groups of said slides a uniform distance, a rotary magnet for each of said plates and operable in response to coded impulse signals for operating said plates in selected combinations, an electromagnet adapted for imparting a reciprocatory movement to the said universal frame, and a control switch operable with a first operation of the indexing means to effect an operation of said electromagnet, whereby the said universal frame will displace all the said value stop pawls into aligned position with respect to the related orders of said actuators, and wherein during said first operation the indexing means thereafter moves one order of said stop pawls into cooperative position with relation to the said permutation slides.

11. In a lister calculator or the like the combination having registering/printing devices, differentially movable actuators therefor, coded read-in translator devices including shiftable magazines each related to a denominational order of said actuators and having pivotally supported thereon a plurality of digit value stop pawls normally positioned out of cooperation with the related one of said actuators, permutation slides each related to a corresponding digit value of said stop pawls and normally ineffective of cooperation therewith, a plurality of rock plates for displacing selected groups of said slides, related electromagnets selectively operable in response to an initial input signal for effecting a movement of said permutation slides independently of operating the said stop pawls, a universal frame operable for setting all the said stop pawls simultaneously into aligned relation with said actuators and to limit said actuators thereby to a zero control position of movement, electromagnetic means for operating said universal frame, and circuit control devices operable by a movement of any of said permutation slides to effect an operation of said electromagnetic means.

12. The invention according to claim 11 and having an electromagnet responsive to a selective input signal for operating said circuit control means independently of operations of said permutation slides.

13. The invention according to claim 11 and including indexing means operable by said circuit control means and adapted for displacing successive orders of said stop pawls into and out of cooperation with the related permutation slides.

14. In a lister calculator or the like having registering and printing devices, differentially movable actuators therefor, cyclic operating means and control devices for effecting an operation thereof; the combination of coded read-in translator devices including a shiftable magazine frame for each related order of said actuators and having pivoted thereon digit value control elements normally positioned out of cooperation with the corresponding order actuator, a universal frame adapted for a first reciprocating movement in a given direction and return for setting all the said control elements into aligned position for limiting subsequent movement of said actuators, permutation slides for setting the control elements of corresponding digit value for any denominational order, and wherein said slides are free for a movement normally out of cooperation therewith, a plurality of rockable decoding plates having operating edges collectively conforming to a given code system for displacing selected groups of said permutation slides, electromagnetic means responsive to coded input signals and adapted for operating said plates in selected combinations, indexing means for sequentially effecting a reciprocatory movement to the successive orders of said magazines to bring the control elements thereon into and out of cooperative relation with the said permutation slides, and wherein operation of any of said permutation slides effects an operation of said indexing means, an electromagnet responsive to a selective input signal and adapted for operating said indexing means independently of an operation of said permutation slides, means including an electromagnet for effecting a said first operation of said universal frame, a circuit control switch operable in a first forward conditioning stroke of the indexing means for energizing said magnet, control means for reopening said switch and deenergizing said magnet by the first active return stroke of said indexing means, and wherein the universal frame is normalized thereby without restoring any of said set digit value control elements.

15. The invention according to claim 14 and wherein the said control means for normalizing the universal frame acts to disable operations of said circuit switch relative to any subsequent operations of the said indexing devices and will act to release control of said circuit means in a final operation of the indexing devices.

16. The invention according to claim 15 and including a reversing pitman between the said electromagnet and the said universal frame and being normally in condition for operation thereby, control means operable by the said cyclic devices for adjusting said pitman in a reverse control position and thereafter to operate the said pitman for imparting a reciprocatory movement to the said universal frame in opposite directions to the said first operations thereof, and wherein the latter of said operations of the universal frame will act to restore any of said set control elements to unset condition.

17. The invention according to claim 16 and including means operable during the final operation of said indexing devices to effect an automatic operation of the said control devices for initiating an operation of the cyclic operating means.

References Cited in the file of this patent

UNITED STATES PATENTS

| | | |
|---|---|---|
| 1,780,884 | Lebeis | Nov. 4, 1930 |
| 2,185,260 | Lasker | Jan. 2, 1940 |
| 2,323,824 | Maschmeyer | July 6, 1943 |
| 2,675,177 | Perrin | Apr. 13, 1954 |

UNITED STATES PATENT OFFICE
CERTIFICATE OF CORRECTION

Patent No. 2,987,243 June 6, 1961

Charles A. Parker

It is hereby certified that error appears in the above numbered patent requiring correction and that the said Letters Patent should read as corrected below.

Column 1, line 10, for "translatar" read -- translator --; column 4, line 24, for "Whlie" read -- While --; column 7, line 6, for "translation" read -- translated --; column 11, line 23, for "read-in-translator" read -- read-in translator --; line 69, after "like" insert -- the --.

Signed and sealed this 11th day of December 1962.

(SEAL)
Attest:

ERNEST W. SWIDER
Attesting Officer

DAVID L. LADD
Commissioner of Patents